United States Patent
Axelrod

(10) Patent No.: US 7,201,116 B2
(45) Date of Patent: Apr. 10, 2007

(54) FOLDABLE/COLLAPSIBLE STRUCTURE

(75) Inventor: Glen S. Axelrod, Colts Neck, NJ (US)

(73) Assignee: T.F.H. Publications, Inc., Neptune City, NJ (US)

( * ) Notice: Subject to any disclaimer, the term of this patent is extended or adjusted under 35 U.S.C. 154(b) by 79 days.

(21) Appl. No.: 10/924,080

(22) Filed: Aug. 23, 2004

(65) Prior Publication Data
US 2006/0037554 A1 Feb. 23, 2006

(51) Int. Cl.
A01K 1/03 (2006.01)
A01K 1/02 (2006.01)

(52) U.S. Cl. .................... 119/496; 119/453; 119/499

(58) Field of Classification Search .............. 119/498, 119/474, 499, 500, 501, 496, 491, 492, 497; 43/61; 190/107, 21, 22; 220/9.2, 9.3, 666, 220/4.28, 4.29, 6
See application file for complete search history.

(56) References Cited

U.S. PATENT DOCUMENTS

| 4,484,540 | A | 11/1984 | Yamamoto | 119/19 |
|---|---|---|---|---|
| 4,576,116 | A | 3/1986 | Binkert | 119/19 |
| 4,903,637 | A | 2/1990 | Devault | 119/19 |
| 5,133,294 | A | 7/1992 | Reid | 119/96 |
| 5,335,618 | A | 8/1994 | Zarola | 119/19 |
| 5,425,681 | A | 6/1995 | Hook | 474/263 |
| 5,671,698 | A | 9/1997 | Farrugia | 119/497 |
| 5,718,191 | A | 2/1998 | O'Donnell | 119/771 |
| 5,769,028 | A | 6/1998 | Deckys | 119/496 |
| 5,803,018 | A * | 9/1998 | Liou | 119/461 |

(Continued)

OTHER PUBLICATIONS

U.S. Appl. No. 10/348,995, filed Jan. 22, 2003, Axelrod, et al.

(Continued)

Primary Examiner—Peter M. Poon
Assistant Examiner—John Holman
(74) Attorney, Agent, or Firm—Grossman, Tucker, Perreault & Pfleger, PLLC

(57) ABSTRACT

A foldable/collapsible structure that folds or collapses between a collapsed condition and an expanded condition. The structure includes a top and a bottom panel, and a pair of opposing sidewalls extending between the top and bottom panels. The opposing sidewalls each include a wall panel and an upper wall panel connected to one another by a hinge. Each of the wall panels and the upper wall portions has an external surface, and the hinged connection between the first and second wall panels allows the external surfaces of the respective all panels and upper wall portions to define an angle equal to or greater than 180 degrees. Upon collapse of the structure, the hinged connection between the wall panel and upper wall portion on one of the opposing walls maintains the external surfaces of the wall panel and upper wall portion at an angle equal to or greater than about 180 degrees.

21 Claims, 4 Drawing Sheets

U.S. PATENT DOCUMENTS

| | | | |
|---|---|---|---|
| 5,832,874 A | 11/1998 | Ravin | 119/496 |
| 5,950,568 A | 9/1999 | Axelrod et al. | 119/499 |
| 6,076,485 A | 6/2000 | Peeples et al. | 119/497 |
| 6,082,305 A | 7/2000 | Burns et al. | 119/497 |
| 6,092,488 A * | 7/2000 | Allawas | 119/497 |
| 6,131,534 A | 10/2000 | Axelrod | 119/499 |
| 6,216,638 B1 | 4/2001 | Pivonka et al. | 119/498 |
| 6,302,061 B1 | 10/2001 | Weatherby et al. | 119/498 |
| 6,345,591 B1 | 2/2002 | Richmond | 119/497 |
| 6,408,797 B2 * | 6/2002 | Pivonka et al. | 119/498 |
| 6,427,631 B1 | 8/2002 | Ross | 119/496 |
| 6,487,990 B1 * | 12/2002 | McNew | 119/168 |
| 6,516,751 B2 | 2/2003 | Burns et al. | 119/497 |
| 6,523,499 B1 | 2/2003 | Chrisco et al. | 119/496 |
| 6,539,895 B2 | 4/2003 | Hoagland | 119/453 |

OTHER PUBLICATIONS

Four Paws K-9 Keeper Dog Crate; Print-out of Directions for assembling the Deluxe Series; Four Paws Products Ltd., Hauppauge, NY 11788 (1 pg).

Petmate Collapsible Kennel; Flyer of Assembly Instructions; Petmate, P.O. Box 1246, Arlington, TX 76004-1246 (2 pgs).

* cited by examiner

FOLDABLE/COLLAPSIBLE STRUCTURE

FIELD

The present disclosure generally relates to a foldable or collapsible structure, and more particularly to a collapsible/foldable pet carrier or portable structure that can be readily converted into a compact condition for ease of storage or transport.

BACKGROUND

A variety of pet carriers have been reported in the prior art, all aimed in one form or another to facilitate pet transportation. Specifically, pet carriers are commonly used by pet owners for carrying their pets on trips or as a means for containing the pets when the pets are shipped from one point to another. Pet carriers also commonly double as sleeping quarters for the pet as the owner may contain the pet overnight to prevent the pet from wandering and potentially damaging the home or hotel room in which the owner is occupying.

Attention is first directed to U.S. Pat. No. 6,131,534, and the art cited therein, which patent is assigned to TFH Publications, Inc, and which is directed in one embodiment to a pet carrier/portable habitat structure for containing a pet comprising a bottom panel containing a floor surface, along with the use of a top panel, a left panel, a right panel and a first end panel and a second end panel. The first and second end panels are releasably engaged to said carrier and the left and right panels each comprise an upper and lower section hingedly connected to one another so as to collapse the left and right panels inwardly into said pet carrier. The carrier may include a perforated tray removably placed within the bottom panel including openings to allow for passage of liquids into the bottom panel, along with supports positioned between the tray and the bottom panel to maintain the tray above the floor surface of the bottom section.

Reference is also made to U.S. Pat. No. 5,950,568, and the art cited therein, which patent is also assigned to TFH Publications Inc., and which is directed in one embodiment to a collapsible/foldable structure comprising a top roof and a bottom platform and front and rear collapsible walls each-pivotally attached to the bottom platform. The structure further contains a pair of sidewalls each pivotally attached to said roof to facilitate inward collapse of said sidewalls when said sidewalls are pivoted toward said bottom platform. Furthermore, the top roof section may contain two roof sections pivotally attached to one another at about the mid-point of the two roof sections, so that the two roof sections can collapse downwardly along their pivotable attachment toward the bottom platform.

Reference is next made to U.S. patent application Ser. No. 10/348,995 entitled Roll-Top Pet Carrier, filed Jan. 22, 2003, and the art cited therein, also assigned to TFH Publications Inc. This application stands directed in one embodiment at a carrier for pets with slidable roll-away sides that retract into a base along with ends that fold down and a handle for carrying. The carrier is described as being preferably made of plastic which allows for light weight, lower cost, and easier cleaning.

Further review of the patent literature begins with U.S. Pat. No. 5,769,028, entitled "Pet Carrier" which discloses a carrier including a main unit and an insert unit. The main unit defines a carrying space having a closed bottom and four sides, one of which has an opening therethrough large enough to permit an animal to enter the space through the opening, and the insert unit has a closed top, four sides, and an open bottom. After the animal has entered the main unit, the insert unit is lowered down into the main unit to close off the side opening. Then a foldable top closure for the main unit is folded to secure the carrier and form a handle structure for carrying the carrier. Both units are foldable and are structured to provide an enhanced strength carrier.

U.S. Pat. No. 5,839,392, entitled "Pet Carrier" discloses a corrugated plastic pet carrier with two side panels. A side panel fold line extends between the base panel and each side panel. In addition, a diagonal fold line is said to extend from each corner of the base panel to a first median fold line for collapsing the base panel, side panels and end panels inwardly for collapsing the container from an erect position to a collapsed, generally flat position, and back to an erect position.

U.S. Pat. No. 5,133,294, entitled "Pet Carrier for Vehicles" discloses a pet carrier for use in a vehicle comprising a platform sized to generally fit-on the passenger seat. Front, rear and side panels are pivotally connected to the platform for movement between generally horizontal positions and upright positions wherein they form a pet enclosure upstanding from the platform.

U.S. Pat. No. 4,903,637 discloses what is termed a "container" to house or carry small household pets, which may be quickly and manually formed between an erected use mode and a flat folded storage mode. The container is of a gable roofed house configuration in its erected mode and comprises an interconnected structure formed by hingeably related rigid planar elements that occupy a relatively small volume in the folded storage mode. Handles carried by the roof provide aid in manual carriage, and releasable fasteners maintain either an erected or storage mode, and en end wall provides a selectively latchable door.

U.S. Pat. No. 4,576,116 discloses a collapsible A-frame house providing a common site for a cat to rest, exercise and play comprised of a roof of carpet-like material including two integral roof panels with their bottom edges connected to opposing edges of a floor panel also of a carpet-like material. Stiffening panels are affixed onto the backside of the roof panels. A cord with two ends slidably passes through the peak into the house, with cat amusement objects connected to each end. The cord additionally provides a manual handle for lifting the house. Collapsing the house for storage or transport, the house is initially lifted by the cord adjacent the peak. The flexible nature of the floor panels permits an outward folding or buckling of the floor along its longitudinal centerline to thereby completely collapse the house into a folded condition.

U.S. Pat. No. 5,335,618 discloses a collapsible animal enclosure comprising a house unit with spaced side walls and a roof of pliable material, and opposite ends forming an enclosed area for housing an animal. Support bows extend transversely across the sidewalls and roof for holding the sidewalls and roof in an open, spread apart condition. The house unit can be collapsed between a fully erect condition and a collapsed condition in which the ends-are pushed inwardly towards one another, collapsing a pliable material between the ends in an accordion-folded manner.

U.S. Pat. No. 5,425,681 discloses an animal house, including a cap, a base, four posts and four walls secured together. Both the cap and base include a groove formed in the inner peripheral portion, and the posts each include two slots for engaging with the edges of the walls so as to solidly secure the walls in place. The animal house may be folded into a compact configuration.

Finally, as it relates to background art concerning pet carriers, attention is also directed to U.S. Pat. No. 4,484,540 entitled, "Collapsible, Portable Domestic Pet Cage", which discloses a collapsible, portable domestic pet cage for carrying with a pet keeper such domestic pets as dogs, cats and the like, wherein bent portions of the cage can be readily constructed using any connection means and fixing means, and when collapsed dimensionally in small form, the whole circumferential walls of the cage is accommodated between vertical walls of a ceiling plate and erected walls of a receptacle plate or dish so as to be made dimensionally in a small size.

SUMMARY

Consistent with the present disclosure, there is provided a collapsible pet carrier structure including a floor panel and first and second opposing walls hingedly attached to the floor panel. Each wall includes two wall panels that are connected to one another by a hinge. Each of the wall panels has an external surface and an internal surface, wherein the internal surface of the wall panels of one wall face the internal surface of the wall panels of the opposing wall. The hinged connection between the first and second wall panels allows the external surfaces of the wall panels to define an angle equal to or greater than 180 degrees. Upon collapse of the pet carrier, the hinged connection between the first and second wall panels on one of the first and second opposing walls maintains the external surfaces of said wall panels at an angle equal to or greater than 180 degrees.

According to another aspect, the present disclosure provides a collapsible structure including a floor panel and a first and second wall panel hingedly attached to opposed sides of the floor panel. First and second upper wall portions are hingedly attached to the first and second wall panels, and a top panel hingedly attached to the first and second upper wall portions. The structure may further include a front panel and a rear panel. An outer surface of the hingedly attached first and second wall panels and an outer surface of the first and second upper wall portions define an outside angle equal to or greater than 180 degrees when the structure is in an expanded configuration. When the structure is in a collapsed configuration, the outer surface of at least one of the first and second wall panels and the outer surface of at least one of the first and second upper wall portions define an angle equal to or greater than 180 degrees.

BRIEF DESCRIPTION OF THE DRAWINGS

Features and advantages of the claimed subject matter will be apparent from the following Detailed Description of embodiments consistent therewith, which description should be considered in conjunction with accompanying drawings, wherein:

DETAILED DESCRIPTION

The foldable/collapsible structure consistent with the claimed subject matter is described herein in the context of the particular exemplary embodiment of a foldable/collapsible pet carrier consistent therewith. While the illustrative embodiment of the foldable/collapsible structure is in the form of a pet carrier it should be understood that the features and advantages of the disclosed structure may have application in numerous alternative structures. For example, a structure consistent with the present disclosure may be embodied in foldable/collapsible structures including storage containers, animal habitats, coolers or ice chests, etc. Those skilled in the art will recognize and appreciate many applications beyond those mentioned herein. The forgoing list should not, therefore, be construed as limiting the application of the present disclosure.

Figure 1:
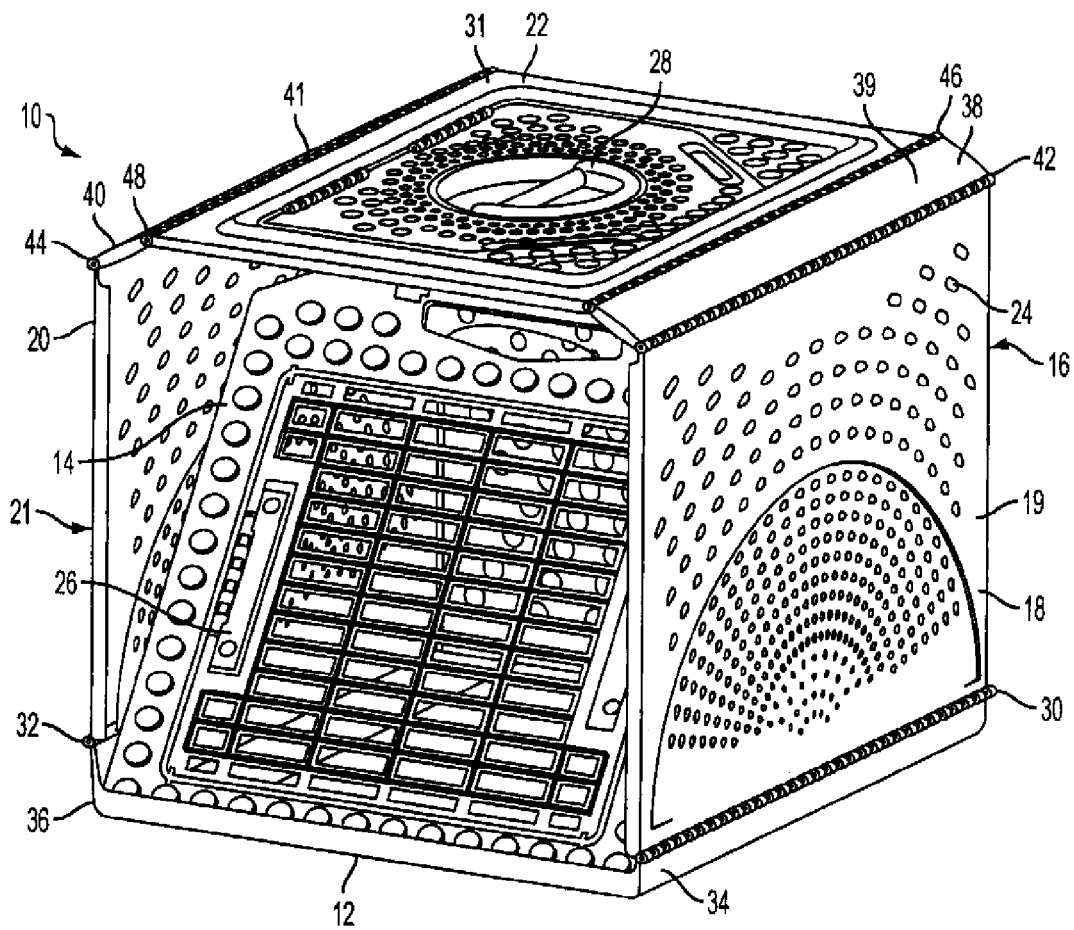
FIG. 1 is a perspective view of an embodiment of a pet carrier consistent with the present disclosure with a partially collapsed front wall.

As shown in FIG. 1, a foldable/collapsible structure consistent with the present disclosure may be provided as a pet carrier 10, according to one embodiment, that may be provided having a generally rectangular configuration. As such, the pet carrier 10 may include a floor panel 12, front 14 and rear 16 panels, and a top panel 22. The pet carrier 10 may also include a pair of opposing walls including first 18 and second 20 wall panels, thereby enclosing the pet carrier 10. The pair of opposing walls may also include a first upper wall portion 38 hingedly connected to the first wall panel 18 and a second upper wall portion 40 hingedly connected to the second wall panel 20. Consistent with the illustrated embodiment, the first 18 and second 20 wall panels may be connected to the top panel 22 by the first and second upper wall portions 38, 40. As shown, the front and rear panels 14, 16 and the first and second wall panels 18, 20 may be generally planar and extend upwardly from the bottom panel 12. The top panel 22 may be generally planar and oriented generally parallel to the floor panel 12.

The various panels 12, 14, 16, 18, 20, and 22 of the pet carrier 10 may be produced from a variety of materials, including metal, polymeric materials, wood, etc., as well as combinations of materials. According to one embodiment, the panels may be formed from a polymeric material, such as acrylonitrile-butadiene-styrene, polyvinylchloride, polyolefin resins, polyester, etc. Numerous other materials, polymeric or otherwise, may also suitably be employed. The panels may be formed using any suitable manufacturing processes, including stamping, machining, casting, injection molding, extruding, thermoforming, blow molding, foaming etc.

As shown, consistent with the embodiment as a pet carrier 10, one or more of the panels may include openings to permit air-flow through the carrier 10, to allow an animal inside the carrier 10 to be seen and to allow the animal to see out of the carrier 10. As in the illustrated embodiment, the openings may be holes 24, perforations, cutouts, etc. in any or all of the front 14, rear 16, first and second wall panels 18, 20, and top panel 22. The floor panel 12 may also be provided including openings, or the floor 12 may be provided as a generally solid panel.

As shown in FIG. 1, the pet carrier 10 may include a door 26 to permit ingress and egress of a pet into and out of the carrier 10. As in the illustrated embodiment, the door 26 may be disposed in the front panel 14. Alternatively, the door 26 may be located in any of the other panels 12, 16, 18, 20, including the top panel 22. The door 26 may be formed of the same material as the remainder of the panel in which the door 26 is disposed. Alternatively, the door may be formed from a different material. For example, a door 26 may be formed from a metal mesh or grid and may be disposed in a front panel 14 made of a polymeric material. According to one embodiment, the door 26 may be hingedly attached in, or over, an opening provided in the front panel 14. The door 26 and/or front panel 14 may include a latch for securing the door in a closed configuration.

The pet carrier 10 may also include a handle 28 to facilitate transporting the carrier 10. Consistent with the illustrated embodiment, the handle 28 may be recessed into the top panel 22. Accordingly, when the handle 28 is not being used it may be folded down to provide a level top surface 31. While not necessary, a level top surface 31 may allow items to be stacked on top of the carrier 10 and/or facilitate storage of the carrier 10.

Consistent with the present disclosure, the pet carrier 10 may be constructed in a manner to allow the pet carrier 10 to be collapsed or folded into a configuration in which the pet carrier 10 takes up a smaller volume than when it is in an expanded configuration. Collapsing the pet carrier 10 may facilitate storage, handling, shipping, etc. of the pet carrier.

Referring to FIG. 1, in order to fold or collapse the pet carrier 10 from an expanded configuration, the front panel 14 and rear panel 16 may be folded or removed. According to one embodiment, the front and rear panels 14, 16 may each be hingedly attached to the floor panel 12. As shown, the hingedly attached front panel 14 may fold inward and may ultimately assume a position on top of, and generally parallel to, the floor panel 12. Similarly, the rear panel 16 may also fold inward and assume a position on top of, and generally parallel to, the front panel 14. In order to allow the rear panel 16 to fold flat onto the front panel 14, the floor panel 12 may include a lip or upstanding spacing member (not shown). The rear panel 16 may be hingedly attached to the lip or spacing member. The lip or spacing member may position the hinge-point between the rear panel 16 and the floor panel 12 such that when the rear panel 16 is folded inwardly to assume an orientation generally parallel to the floor panel 14, the rear panel 16 may be elevated off of the floor panel by the approximate thickness of the front panel 14. It should be noted that while the foregoing describes the front panel 14 first folding inward onto the floor panel 12 and then the rear panel 16 folding onto the front panel 14, an opposite configuration may also be employed.

Consistent with another embodiment, rather than, or in addition to, providing the floor panel 12 including a lip or spacing member at a front and/or rear side thereof, the front panel 14 and/or the rear panel 16 may be provided having a flexible region adjacent the floor panel 12. The flexible region of the front panel 14 and/or rear panel 16 may be configured to allow the front panel 14 and/or rear panel 16 "jog up" from the hinged connection to the floor panel 12 to assume a generally parallel and/or stacked arrangement on the floor panel 12 when the front and rear panels 14, 16 are in a folded or collapsed configuration. For example, consistent with an embodiment the front panel 14 folds inwardly onto the floor panel 12 and the rear panel 16 folds inwardly onto the front panel 14. In the previously described embodiment, in order to allow the rear panel 16 to lie on top of the front panel 14 and assume an orientation parallel to the floor panel 12 the hinged connection between the rear panel 16 and the floor panel 12 was elevated by a lip or spacer extending from the floor panel 12. Consistent with the use of a flexible region adjacent the floor panel 12, a region of the rear panel 16 away from the floor panel 12 may assume an orientation generally parallel to the floor panel 12. However, a region of the rear panel 16 adjacent to the floor panel 12 may assume a curved or angled shape extending between the floor panel 12 and the region of the rear panel 16 parallel to the floor panel 12.

Consistent with an embodiment in which the front panel 14 and/or the rear panel 16 include a flexible region, the flexible region may include an articulating structure including one or more hinges. The one or more hinges may allow, for example, a portion of the rear panel 16 away from the hinged connection to the floor panel 12 to assume an angled orientation relative to a region of the rear panel 16 adjacent to the hinged connection to the floor panel 12. Consistent with a similar embodiment, the flexible region of the front panel 14 and/or the rear panel 16 may include a region that is resiliently deformable such that, in a folded or collapsed configuration, the front panel 14 and/or the rear panel 16 may resiliently deform from a generally planar configuration to a bent or curved configuration that may allow the front and rear panels 14, 16 to fold inward and assume a stacked arrangement on, and generally parallel to, the floor panel 12.

According to an alternative embodiment the front and rear panels 14, 16 may not be hingedly attached to the floor panel 12. The front and rear panels 14, 16 may, instead, be releasably attached to the floor panel 12 and/or one or both of the wall panels 18, 20, the first and second upper wall portions 38, 40, and/or the top panel 22. According to such a configuration, rather than hingedly folding the front and rear panels 14, 16 inward, the front and rear panels 14, 16 may be released from the floor panel 12 and/or one or more of the first and second wall panels 18, 20, the first and second upper wall portions 38, 40, and the top panel 22. Once the front and rear panels 14, 16 have been released they may be either removed from the carrier 10 or may be stowed on the floor panel 12 inside of the carrier 10, for example, stacked one on top of the other.

Consistent with the present disclosure, the first and second wall panels 18 and 20 may be hingedly attached to opposing wall section 34, 36 of the floor panel 12 by respective hinges 30, 32. According to various embodiments, the hinges 30, 32 may include continuous hinge lines, such as in the illustrated embodiment. The hinges 30, 32 may also include individual hinges spaced apart along the cooperating edges of the wall panels 18, 20 and floor panel 12. The hinges 30, 32 may also include living hinges, either as add-on features secured to the wall panels 18, 20 and floor panel 12, or may be integrally formed with the wall panels 18, 20 and the floor panel 12. The hinges 30, 32 may also include various other configurations and features capable of achieving pivotal movement of the wall panels 18, 20 relative to the floor panel 12. Consistent with the present disclosure, any variety of hinge features may be used, and such hinge features may be integrally formed with the first and second wall panels 18, 20 and or the opposing wall sections 34, 36. Alternatively, hinge features employed herein may be separate features attached to the first and second wall panels 18, 20 and opposing wall sections 34, 36 of the floor panel 12. Further, the hinge features may be integral with one of the wall panels 18, 20 or the opposing wall sections 34, 36 and may be a separate feature attached to the other of the first and second wall panels 18, 20 or opposing wall sections 34, 36.

As shown, the first and second wall panels 18, 20 may be hingedly connected to respective upper wall portions 38, 40 by hinges 42, 44, respectively. According to an embodiment consistent with the present disclosure, the upper wall portions 38, 40 may, in turn, be hingedly connected to the top panel 22 by respective hinges 46, 48. As with the hinged connection between the first and second wall panels 18, 20 and the floor panel 12, the hinges 42, 44 between the wall panels 18, 20 and upper wall portions 38, 40 as well as the hinges 46, 48 between the upper wall portions 38, 40 and the top panel 22 may be provided having a variety of configurations. For example, as in the illustrated embodiment, the hinges, 42, 44, 46, 48 may all be provided as a continuous hinge line. Alternatively, the hinges 42, 44, 46, 48 may be individual hinges spaced along the respective joints, may include living hinges, etc. Similar to the previously described hinges 30, 32, the hinges 42, 44, 48, 48 may be integral with the corresponding wall features 18, 20, 38, 40 and top panel 22, or may include separate features that may be attached to the wall panels 18, 20; upper wall portions 38, 40; or top panel 22. Furthermore, the various hinges 30, 32, 42, 44, 46, 48 need not be the same as one another.

Consistent with the present disclosure, the respective sizes of the floor panel 12, top panel 22, wall panels 18, 20 and upper wall portions 38, 40 may be provided such that the external surface 39, 41 of the upper wall portions 38, 40 and the external surfaces 19, 21 of the wall panels 18, 20 define an angle equal to or greater than 180 degrees.

Figure 2:
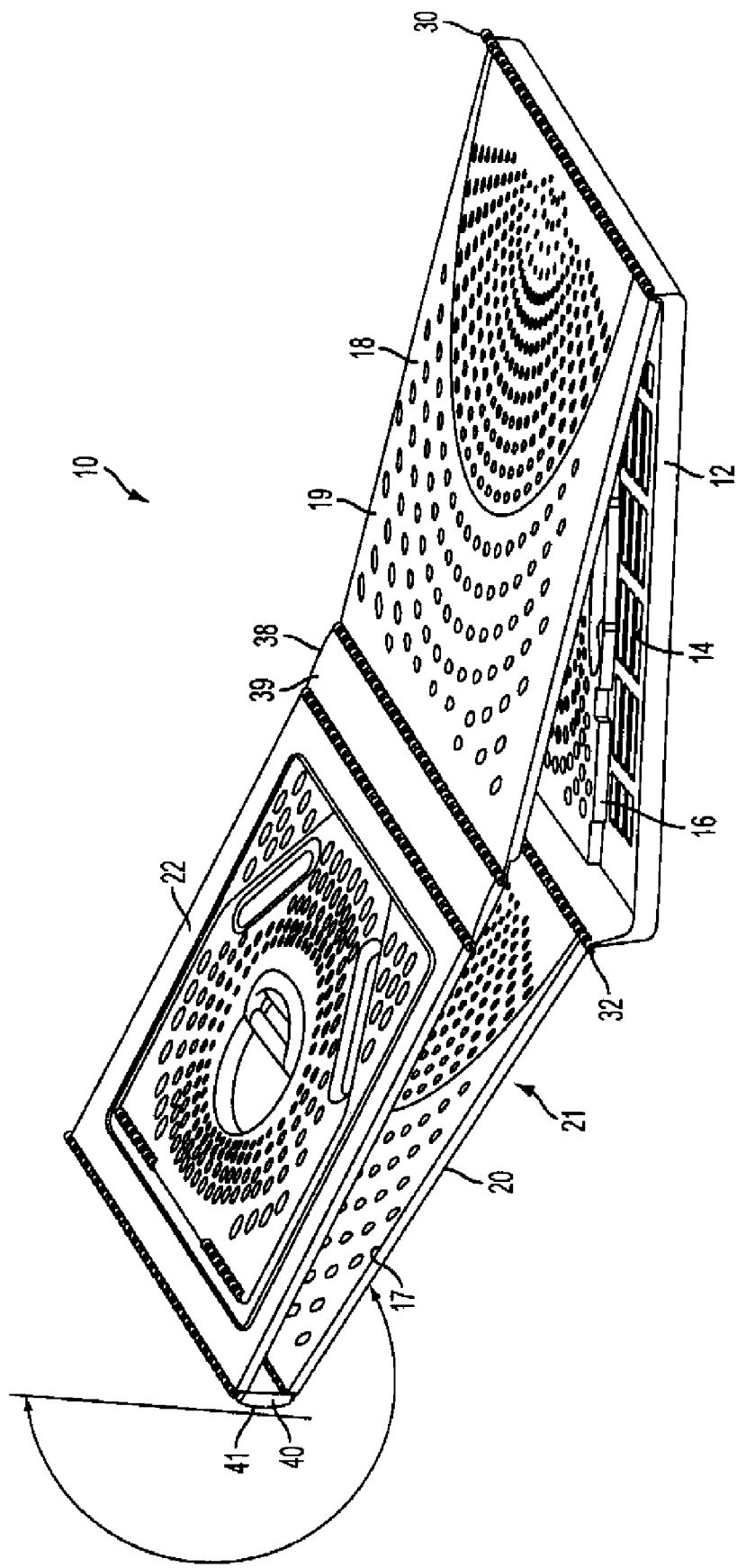
FIG. 2 illustrates the carrier of FIG. 1 with the walls collapsed.

Turning to FIG. 2, after the front panel 14 and rear panel 16 have been pivoted inward onto the floor panel 12, or removed from the carrier 10, the first and second wall panels 18, 20 and top panel 22 may be folded or collapsed. Both wall panels 18, 20 may be pivoted to the same side along the hinges 30, 32 connecting the first and second wall panels 18, 20 to the floor panel 12. As shown, the first and second wall panels 18, 20 may be pivoted such that the first wall panel 18 assumes a position generally overlying the floor panel 12. The second wall panel 20 may assume a position extending outwardly from the floor panel 12. The top panel 22 may assume a position generally overlying the second wall panel 20 extending outwardly from the floor panel 12. Accordingly, the first and second wall panels 18, 20 may move from a configuration in which the internal surfaces of the first and second wall panels 18, 20 are facing one another, to a configuration in which the internal surface of the first wall panel 18 may generally be facing the floor panel 12, and the internal surface 17 of the second wall panel 20 may generally be facing the inside surface of the top panel 22.

As discussed with reference to FIG. 1, the carrier 10 may have an initial, i.e., fully expanded, configuration in which both upper wall portions 38, 40 are angled inwardly from the first and second wall panels 18, 20 toward the top panel 22. In the initial configuration the external surface 39, 41 of the upper wall portions 38, 40 and the external surfaces 19, 21 of the wall panels 18, 20 define an angle equal to or greater than 180 degrees. As illustrated in FIG. 2, as the carrier 10 is folded or collapsed, the upper wall portions 38, 40 may pivot relative to the wall panels 18, 20. For example, in the illustrated embodiment the angle between the external surface 39 of a first upper wall portion 38 and the external surface 19 of the corresponding first wall panel 18 may decrease, for example to an angle of about 180 degrees or less. At the same time, the angle between the external surface 41 of the other upper wall portion 40 and the external surface 21 of the corresponding second wall panel 20 may increase, for example, to an angle on the order of about 270 degrees, as shown in FIG. 2.

Figure 3:
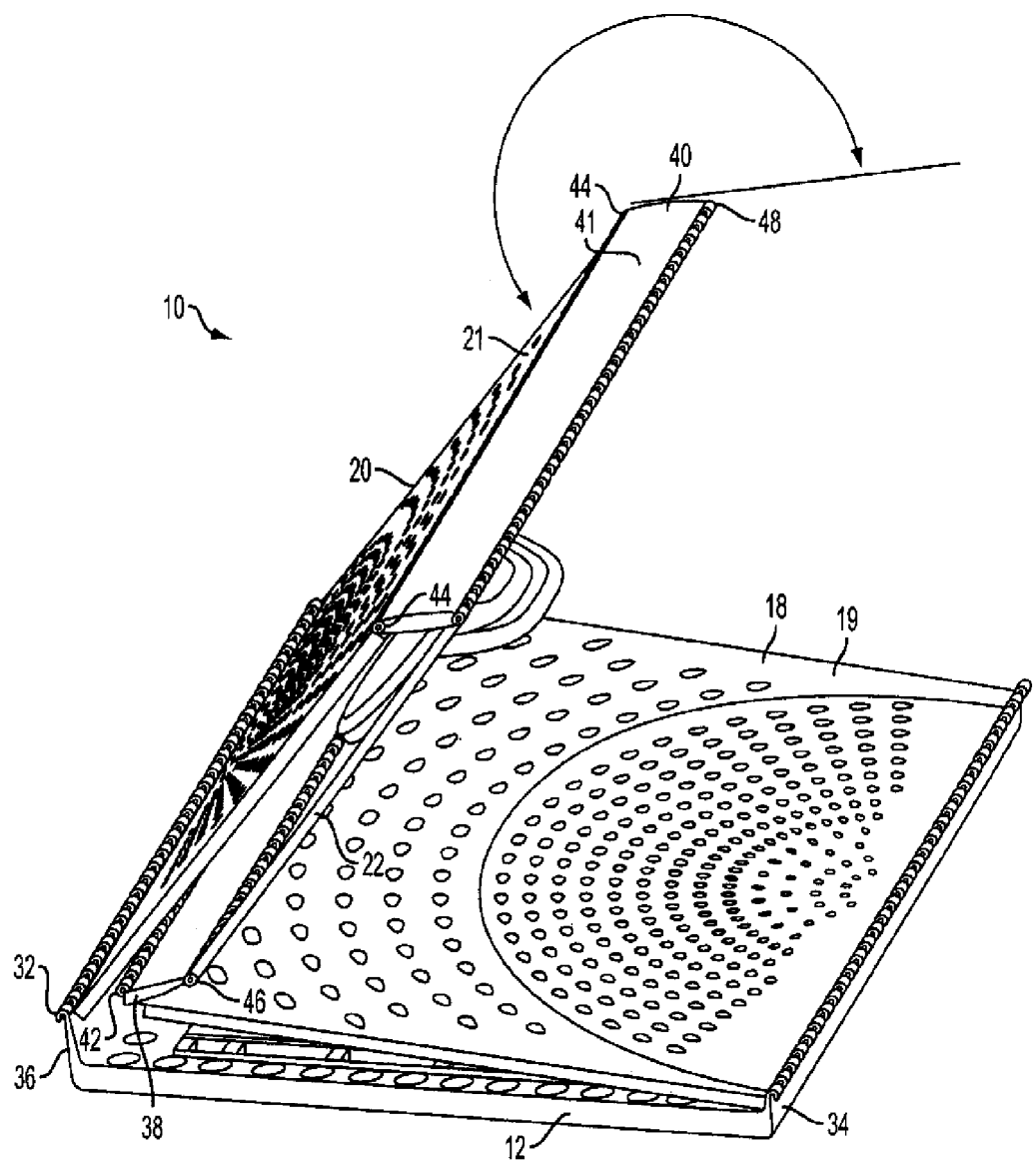
FIG. 3 illustrates the carrier of FIG. 1 in a partially folded configuration.

Turning next to FIG. 3, after the first and second wall panels 18, 20 and the top panel 22 have been pivoted to one side, the wall panels 18, 20 and top panel 22 may be folded over on top of one another. As shown, the first wall panel 18 may be moved to a position overlying the floor panel 12. The second wall panel 20 and the top panel 22 may be pivoted back inwardly toward the floor panel 12. The second wall panel 20 and the top panel 22 may be pivoted toward the floor panel 12 via use of hinge 32 and hinge 42. Furthermore, the top panel 22 may pivot about the hinge 46 (see FIG. 1) toward a position above the floor panel 12. Similarly, the second upper wall portion 40 may pivot relative to one, or both, of the top panel 22 and the second wall panel 20 about hinges 48, 44 respectively.

As the pet carrier 10 proceeds to a collapsed configuration, the angle between the external surface 19 of the first wall panel 18 and the external surface 39 of the first upper wall portion 38 may continue to decrease. However, the angle between the external surface 21 of the second wall panel 20 and the external surface 41 of the second upper wall portion 40 may also decrease, but may maintain an angle equal to or greater than 180 degrees.

Figure 4:
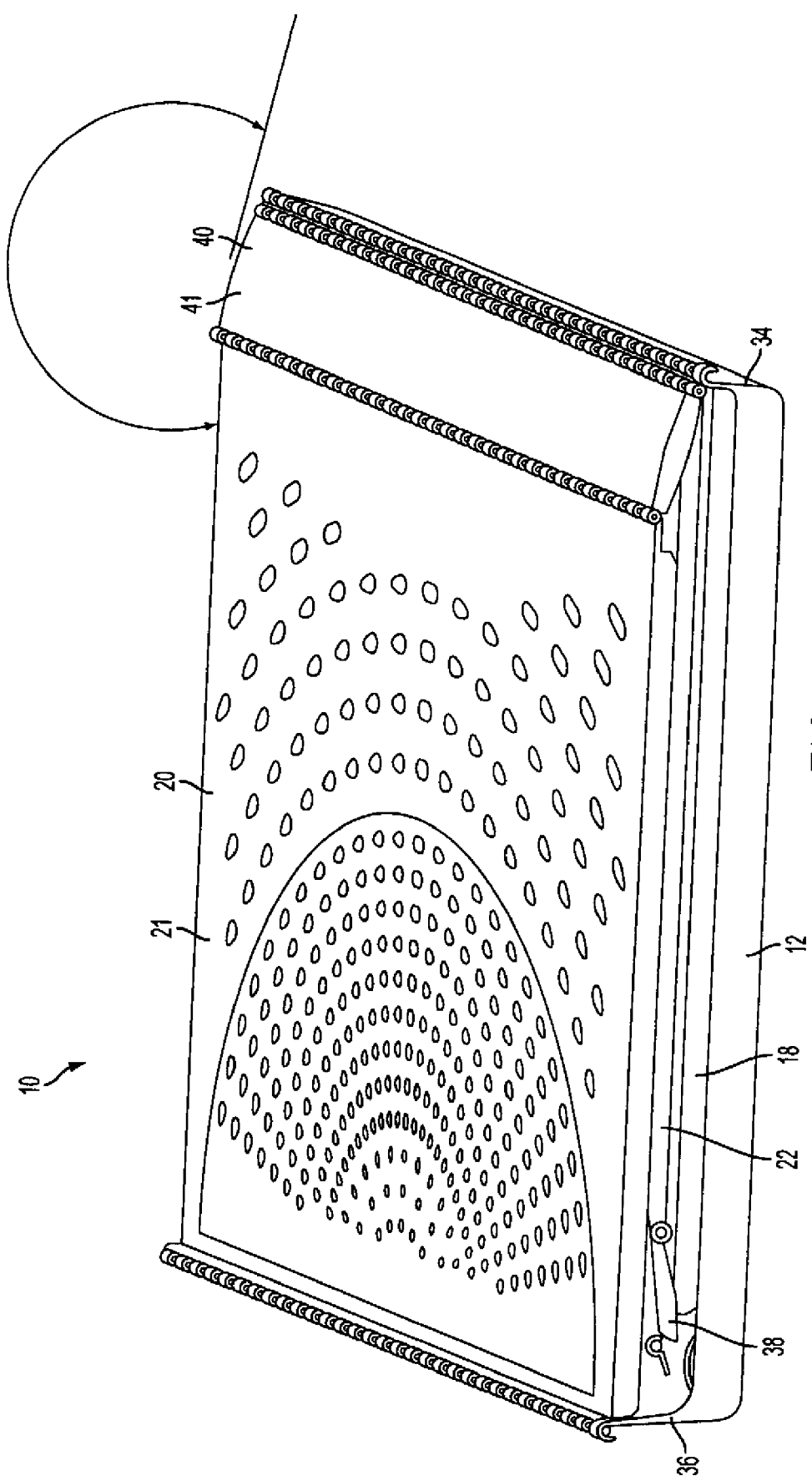
FIG. 4 illustrates the carrier of FIG. 1 in a completely collapsed/folded configuration.

Finally, referring to FIG. 4, the carrier 10 is shown in a fully collapsed or folded configuration. As shown, in a fully collapsed or folded configuration the carrier may, according to some embodiments, assume a generally flat, planar configuration in which the front 14, rear, 16, first wall panel 18, top panel 22, and second wall panel 20 are in a generally stacked arrangement on the floor panel 12. The folded or collapsed configuration of the carrier 10 is relatively compact and clearly less cumbersome than when the carrier 10 is in an expanded configuration. Accordingly, the collapsed or folded configuration may facilitate transport as well as storage of the carrier 10 when the carrier 10 is not in use.

As shown in the illustrated embodiment, when the carrier 10 is in a fully collapsed and/or folded condition the first upper wall portion 38 may generally be disposed over the first wall panel 18. By contrast to the overlying arrangement of the first wall panel 18 and the first upper wall portion 38, the second upper wall section 40 may generally extend from the second wall panel 20 and to the top panel 22. Accordingly, the external surface 21 of the second wall panel 20 and the external surface 41 of the second upper wall section 40 can define an angle that is equal to, or greater than, 180 degree.

Opposing wall sections 34, 36 of the floor panel 12 may be of different heights, such that when the opposing walls are in a folded or collapsed configuration they may achieve a stacked arrangement with the first and second wall panels being generally parallel to the floor panel 12. Additionally, according to one embodiment, the height of the opposing wall sections 34, 36 may be adapted such that in a folded or collapsed configuration the first and second wall panels 18, 20 may achieve a stacked arrangement on top of the front and rear panels 14, 16, that, themselves, may be in a stacked arrangement on the floor panel 12.

Consistent with another embodiment, rather than, or in addition to, providing opposing wall sections 34, 36 the first wall panel 18 and/or the second wall panel 20 may be provided having a flexible region adjacent the floor panel 12. The flexible region of the first wall panel 18 and/or the second wall panel 20 may assume an angled or curved shape when the first wall panel 18 and/or the second wall panel 20 is folded inwardly toward the floor pane 12. The angled or curved shape adjacent the floor panel 12 may accommodate the thickness of any underlying panels stacked on the floor panel 12, e.g., the front panel 14 and the rear panel 16, and allow the first wall panel 18 and/or second wall panel 20 to assume a generally parallel and/or stacked arrangement relative to the floor panel 12. Consistent with such an embodiment, the flexible region of the first wall panel 18 and/or the second wall panel 20 may include an articulating structure including one or more hinges. The one or more hinges may allow, for example, a portion of the second wall panel 20 away from the hinged connection to the floor panel 12 to assume an angled orientation relative to a region of the second wall panel 20 adjacent to the hinged connection to the floor panel 12. Accordingly, it may be possible for the portion of the second wall panel 20 away from the hinged connection to the floor panel 12 to be oriented parallel to the floor panel 12 and to be disposed above the top panel 22 and the first wall panel 18. Consistent with a similar embodiment, the flexible region of the first wall panel 18 and/or the second wall panel 20 may include a region that is resiliently deformable such that, in a folded or collapsed configuration, the first wall panel 18 and/or the second wall panel 20 may resiliently deform from a generally planar configuration to include a bent or curved configuration that may allow the front and rear panels 14, 16 to pivot inward and assume a stacked arrangement on, and generally parallel to, the floor panel 12.

Consistent with the present disclosure, the carrier 10 may be expanded in a manner that is generally the reverse of the process for collapsing the carrier 10. For example, the second wall panel 20 and the top panel 22 may be unfolded from above the floor panel 12. The first and second wall panels 18, 20 and the top panel 22 may then be expanded such that the first and second wall panels 18, 20 are generally perpendicular to the floor panel 12 and the top panel 22 is arranged generally parallel to the floor panel 12. Once the first and second wall panels 18, 20 and the top panel 22 have been expanded the rear panel 16 and the front panel 14 may be folded out to a generally upright position. When the rear panel 16 and the front panel 14 are folded out into a generally upright position, the fit of the front panel 14 and the rear panel 16 inside of the cross-section defined by the first and second wall panels 18, 20, the first and second upper wall portions 38, 40 and the top panel 22 and the floor panel 12 may rigidify the carrier 10 against collapsing by restricting movement of the walls 18, 20, 38, 40, top panel 22, and bottom 12 relative to each other. The structure may be further rigidified by providing latches, mechanical fasteners, interacting protrusions and detents, etc. for releasably securing the front panel 14 and/or the rear panel 16 to at least one other panel 18, 20, 38, 40, 22, and/or 12 to maintain the front panel 14 and/or the rear panel 16 in an upright position.

While the present disclosure has set forth and described particular embodiments of foldable and/or collapsible structures consistent with the claimed subject matter, it will be apparent that such embodiments are susceptible to variation and modification without departing from the spirit or the scope of the invention herein. Accordingly, the invention should not be limited by the particular disclosed embodiments, but rather only by the claims appended hereto.

What is claimed is:

1. A collapsible pet carrier structure comprising:
   a floor panel;
   first and second opposing walls hingedly attached to the floor panel, each wall comprising first and second wall panels connected to one another by a hinge, each of the wall panels having an external surface and an internal surface, the internal surface of the wall panels of one wall facing the internal surface of the wall panels of the opposing wall; and
   the hinged connection between the first and second wall panels allowing the external surfaces of the wall panels to define an angle equal to or greater than about 180 degrees when the structure is expanded;
   wherein, upon collapse of said pet carrier, the hinged connection between the first and second wall panels on said first opposing wall maintains the external surfaces of said wall panels at an angle equal to or greater than about 180 degrees and the hinged connection between the first and second wall panels on said second opposing wall configures the external surfaces of said wall panels at an angle less than about 180 degrees.

2. A structure according to claim 1 wherein said floor panel comprises a pair of opposing wall sections, said first and second opposing walls hingedly attached to said pair of opposing wall sections.

3. A structure according to claim 2 wherein a first wall section of said pair of opposing wall sections has a greater height than a second wall section of said pair of opposing wall sections.

4. A structure according to claim 1 further comprising a top panel hingedly attached to each of said first and second opposing walls.

5. A structure according to claim 4 further comprising a door in said top panel.

6. A structure according to claim 4 wherein said top panel comprises a handle.

7. A structure according to claim 1 further comprising a front panel hingedly connected to said floor panel and a rear panel hingedly connected to said floor panel.

8. A structure according to claim 7 further comprising a door in one of said front panel or said rear panel.

9. A structure according to claim 7 wherein at least one of said front panel and said rear panel are hingedly attached to said floor panel via a lip extending from said floor panel.

10. A structure according to claim 1 wherein at least one of said first and second opposing walls comprises a plurality of openings.

11. A structure according to claim 1 further comprising a front panel and a rear panel, at least one of said front panel and said rear panel being removable from said structure.

12. A collapsible structure comprising:
    a floor panel;
    a front panel and a rear panel;
    a first and second wall panel hingedly attached to opposed sides of said floor panel;
    a first and second upper wall portion hingedly attached to said first and second wall panels; and
    a top panel hingedly attached to said first and second upper wall portions;
    an outer surface of said hingedly attached first and second wall panels and an outer surface of said first and second upper wall portions defining an outside angle equal to or greater than 180 degrees when said structure is in an expanded configuration, and said outer surface of at least one of said first and second wall panels and said outer surface of at least one of said first and second upper wall portions defining an angle equal to or greater than about 180 degrees when said structure is in a collapsed configuration, and at least one of said first and second wall panels and said outer surface of at least one of said first and second upper wall portions defining an angle less than about 180 degrees when said structure is in a collapsed configuration.

13. A structure according to claim 12 wherein at least one of said front panel and said rear panel are hingedly connected to said floor panel via an upstanding spacer.

14. A structure according to claim 12 wherein said floor panel comprises a pair of opposing wall sections.

15. A structure according to claim 12 wherein said front and rear panels are hingedly attached to said floor panel.

16. A structure according to claim 12 wherein said front and rear panels are removable.

17. A structure according to claim 12 comprising a plurality of openings in at least one of said floor panel, said first wall panel, said second wall panel, said front panel, or said rear panel.

18. A structure according to claim 12 wherein said top panel comprises a handle.

19. A structure according to claim 12 wherein said first and second wall panels comprises a flexible region adjacent said floor panel.

20. A structure according to claim 14 wherein said first and second wall panels are hingedly attached to said floor panel via a first and second opposed wall sections extending form said floor panel.

21. A structure according to claim 20 wherein said first opposed wall section has a greater height than said second opposed wall section.

* * * * *